United States Patent
Pogue

(10) Patent No.: US 7,601,007 B1
(45) Date of Patent: Oct. 13, 2009

(54) EMERGENCY APPARATUS FOR LIGHTING AN ABANDONED TRAILER

(76) Inventor: Randall Pogue, 3546 Hidden La., Saginaw, MI (US) 48601

( * ) Notice: Subject to any disclaimer, the term of this patent is extended or adjusted under 35 U.S.C. 154(b) by 72 days.

(21) Appl. No.: 11/891,592

(22) Filed: Aug. 13, 2007

(51) Int. Cl.
*H01R 33/00* (2006.01)

(52) U.S. Cl. ........................................ 439/35

(58) Field of Classification Search ............. 439/34–35
See application file for complete search history.

(56) References Cited

U.S. PATENT DOCUMENTS

| | | | |
|---|---|---|---|
| 2,800,204 | A | 7/1957 | Wall |
| 3,110,507 | A | 11/1963 | Riner |
| 4,005,313 | A | 1/1977 | Tibhits |
| 4,017,827 | A | 4/1977 | Brodesser |
| 4,142,172 | A | 2/1979 | Menard |
| 4,368,455 | A | 1/1983 | Menard |
| 4,395,696 | A | 7/1983 | Menard |
| 5,406,837 | A | 4/1995 | Britt |
| 5,602,482 | A | 2/1997 | Gutierrez |
| 2003/0020325 | A1* | 1/2003 | Herbst et al. ............... 303/1 |
| 2004/0156703 | A1* | 8/2004 | Benedikt ................ 414/498 |
| 2005/0037632 | A1* | 2/2005 | Ihde ............................ 439/35 |
| 2007/0171031 | A1* | 7/2007 | Hastings ..................... 340/431 |

FOREIGN PATENT DOCUMENTS

| | | |
|---|---|---|
| DE | 19724342 | 1/1999 |
| EP | 1018453 A3 | 2/2000 |
| WO | WO 02/22395 A2 | 3/2002 |

* cited by examiner

*Primary Examiner*—Renee Luebke
*Assistant Examiner*—Larisa Tsukerman
(74) *Attorney, Agent, or Firm*—Robert L. McKellar; McKellar IP Law, PLLC

(57) ABSTRACT

Apparatus for illuminating the lights of an abandoned trailer having a pigtail connector which has been disconnected from a complementally formed pigtail connector on a draft vehicle and more particularly to a plug, stored on the trailer and including a plurality of electrically conductive pins aligned with, and formed complementally, to electrically conductive pins on the trailer pigtail connector to detachably couple the trailer battery to the trailer lights. Switch mechanism is provided for selectively coupling and decoupling the plurality of electrically conductive pins on the trailer pigtail connector to each other so that the trailer mounted battery can be selectively coupled in circuit to the lights when the trailer is unhitched. An electrically non-conductive yieldable housing stows the plug and the trailer pigtail connector in mating engagement on the trailer.

4 Claims, 3 Drawing Sheets

EMERGENCY APPARATUS FOR LIGHTING AN ABANDONED TRAILER

BACKGROUND OF THE INVENTION

1. Field of the Invention

This invention relates to apparatus for illuminating the lights of a travel trailer which is disconnected from a tow vehicle and more particularly to an electrical connection system for selectively electrically connecting a trailer mounted battery in circuit with the lights. A holder is provided on the trailer for stowing the electrical connection system and the trailer mounted pigtail in mating relation.

2. Description of Prior Art and Advantages

Travel trailers, such as those pivotally coupled to a trailer hitch of a draft vehicle or a so-called "5$^{th}$ wheel trailer" which is pivotally coupled to the bed of a pickup truck, regularly include an emergency battery pack, which is activated to automatically electrically actuate a trailer braking system such as that disclosed in U.S. Pat. No. 3,110,507 issued Nov. 12, 1963 and/or U.S. Pat. No. 2,800,204 issued Jul. 23, 1957.

Such travel trailers are frequently equipped with running lights, side lights and over head clearance lights which are typically electrically connected to, and energized by, the electrical system of the tow vehicle. When the trailer is uncoupled from the tow vehicle and abandoned aside a roadway, a typical trailer, although including a battery, includes no lighting system for quickly, easily and safely connecting the trailer light to the trailer mounted battery. Thus, an unlighted and unhitched or abandoned trailer which is parked on the shoulder of a roadway creates a safety obstruction. Accordingly, it is an advantage of the present invention to provide new and novel emergency apparatus for lighting an abandoned trailer by a power source on the trailer typically utilized to actuate the emergency brakes to stop a trailer which is inadvertently disconnected from a tow vehicle.

Various auxiliary power packs and flasher systems have been provided for energizing or flashing the trailer lights, such as that disclosed in U.S. Pat. No. 4,017,827 issued Apr. 12, 1977; U.S. Pat. No. 4,368,455 issued Jan. 11, 1983; U.S. Pat. No. 4,395,696 issued Jul. 26, 1983; U.S. Pat. No. 5,602,482 issued Feb. 11, 1997 and International Application published under the PCT, International Publication No. W002/22395A2.

Such systems include large and expensive cases or containers, flasher units, one or two additional batteries, and auxiliary coupling devices which are relatively expensive, cumbersome and problematic to store. Accordingly, it is an advantage of the present invention to provide new and novel apparatus, which incorporates the trailer carried power supply for normally actuating the emergency brakes, for electrically energizing the lights of an abandoned trailer.

The prior art trailers typically include a pigtail connector having an electrical socket which is coupled to a complementally formed male pigtail connector plug on the draft vehicle. The present invention contemplates trailer mounted, auxiliary male connector plug which is formed complementally with, and detachably received by, the socket after the socket has been decoupled from the tow vehicle pigtail plug. The socket will typically include an electrical socket terminal which is independently coupled to the auxiliary trailer mounted battery and braking system as well as a separate second socket terminal independently electrically connected to the trailer lights. The auxiliary male plug, constructed according to the present invention, incorporates electrically independent plug terminals which electrically mate with the socket terminals. The apparatus constructed according to the present invention includes a short circuiting system which selectively electrically connects the plug terminals to each other to complete an electrical circuit from the trailer supported battery through the socket terminals and mating plug terminals and thence to the trailer lights, without the need for an additional auxiliary, power pack, cables, etc.

It is another advantage of the present invention to provide apparatus of the type described including a switch in the short circuiting system which allows the trailer mounted battery to be selectively electrically connected in circuit with the lights.

These and other objects and advantages of the present invention will become more readily apparent of those of ordinary skill and the art as the description thereof proceeds.

SUMMARY OF THE INVENTION

Emergency electrical coupling apparatus for a trailer having a battery, at least one electrically energized light, and first electrical connector, operable in one condition for detachably coupling the light to a second complementally formed connector on a draft vehicle and in a stowed condition, decoupled from the second complementally formed connector; the first electrical connector has first and second independent electrical terminals electrically connected in individual first and second circuits, respectively, to the battery and the light, respectively; the emergency electrical device includes a third complementally formed, electrical connector, complementally formed with the first electrical connector, for detachably coupling to the first electrical connector in the second stowed condition; and circuit completion mechanism on the third electrical connector for electrically coupling the first and second terminals together to complete an electrical circuit between the first and second circuits and electrically connect the battery to the light and energize the light when the first electrical connector and said third electrical connector are coupled together in the stowed position.

DESCRIPTION OF THE DRAWINGS

The invention may be more readily understood by reference to the accompanying drawings, in which:

FIG. 1A is a greatly reduced, side elevational view illustrating a trailer including apparatus constructed according to the present invention, unhitched and electrically uncoupled from a tow vehicle;

DESCRIPTION OF PREFERRED EMBODIMENT

Figure 1:
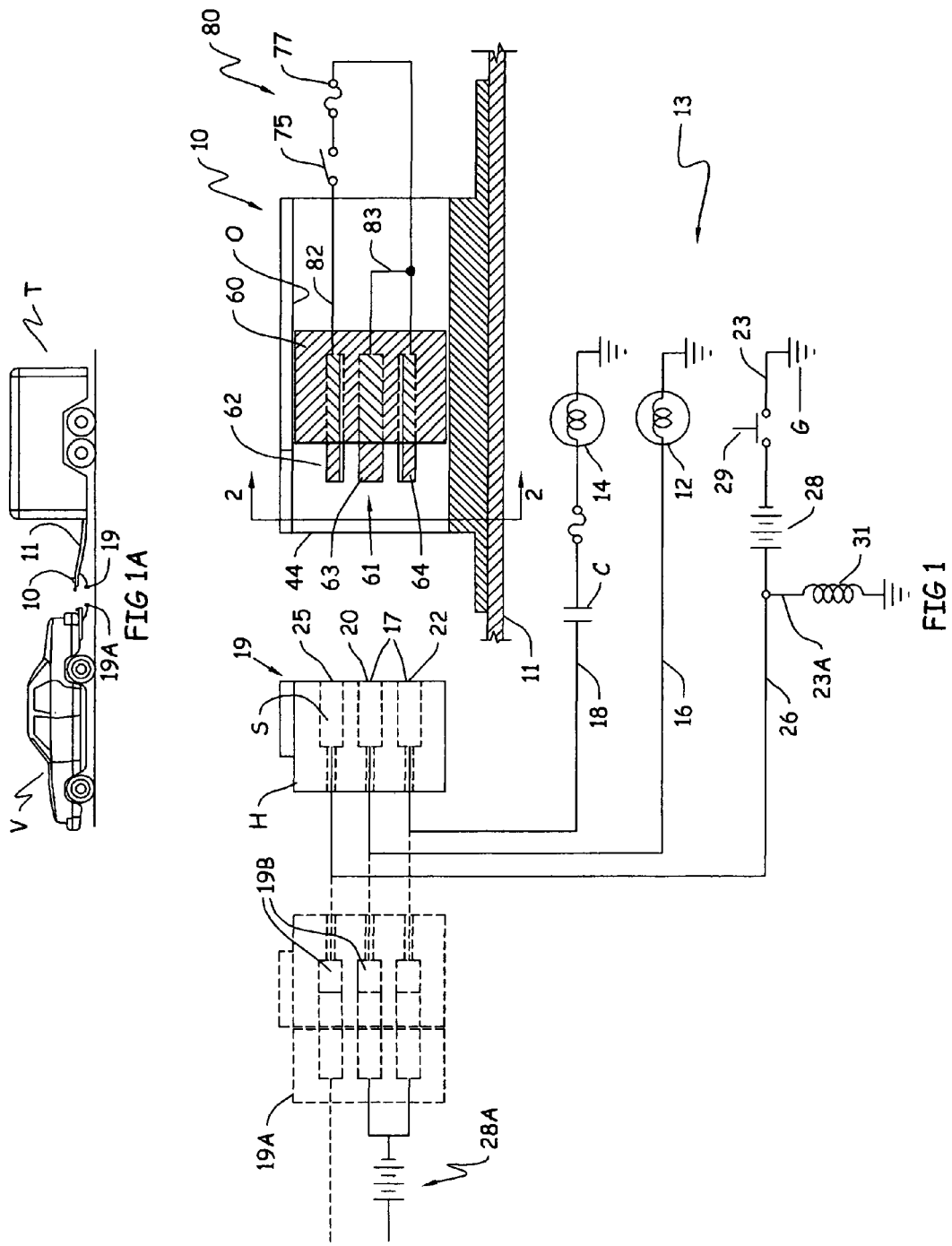
FIG. 1 is a sectional side view of emergency apparatus for lighting an abandoned trailer, constructed according to the present invention and taken along the section line 1-1 of FIG. 2, illustrating a trailer pigtail connector in chain lines coupled to a tow vehicle pigtail and in solid lines disconnected from the tow vehicle and in position to be coupled to apparatus constructed according to the present invention.

The emergency apparatus, constructed according to the present invention and generally designated 10, is particularly adapted for use with an abandoned travel trailer T having a pre-existing electrical wiring harness or system, generally designated 13, and a draft tongue 11. The pre-existing wiring system 13 includes headlights and/or tail lights 12 and 12A, coupled to ground potential via an electrical circuit line 16 and a circuit line 18 which independently connects turn signals 14 and 14A, also referred to as LT and RT, to ground potential and includes a series connected flasher circuit or capacitor, generally designated C, for intermittently charging and discharging electrical energy to the turn signals 14 and 14A, as usual. It should be understood that any number of additional or different lighting circuits may be coupled to additional or other lights (not shown) such as overhead lamps 86, can be utilized but are not illustrated herein.

An electrical pigtail connector or coupler, generally designated 19, is coupled to the trailer wiring, generally designated 13, and comprises a conventional seven way trailer socket which is well known in the art. The connector 19 includes an insulated socket housing H provided with a plurality of female sockets S therein mounting a plurality of so-called female socket terminals, generally designated 17, and more particularly including seven individual terminals 20, 20A, 21, 22, 22A, 25 and 25A, which are coupled to various circuit elements on the trailer T, as will be more particularly described hereinafter.

The trailer T includes an emergency braking system which is schematically illustrated as a normally de-energized electrical solenoid 31 coupled, via circuit line 23A electrically connected to ground potential and to a circuit line 23 that is also electrically connected to ground potential and includes a trailer mounted battery 28 and a normally open "dead man switch" 29 which is automatically closed when the trailer T is inadvertently unhitched from a draft vehicle V to actuate the brake solenoid 31. The circuit line 23A, which includes the battery 28 and the brake solenoid 31, is connected to the female socket terminal 25 via a circuit line 26. If desired, the central terminal 21 may be coupled in circuit with power supply and trailer backup lights (not shown).

When the trailer is being towed by a draft vehicle V, the socket coupler 19 is coupled to a complementally formed male coupler or pigtail 19A on the tow vehicle V as illustrated in chain lines in FIG. 1. The pigtail 19A includes a plurality of blade terminals, generally designated 19B, which when the connector 19 is disposed in the position illustrated in chain lines in FIG. 1, are detachably received by the female socket terminals 17 for connecting the automobile battery 28A in circuit with the terminals 20 and 22 and the lights 12 and 14. When the vehicle V and trailer T are unhitched as illustrated in FIG. 1A, the trailer coupler pigtail 19 is disconnected from the male tow vehicle pigtail 19A as illustrated in solid lines in FIG. 1. In order to energize the lights 12 and 14 when the trailer coupler 19 is disconnected from the tow vehicle connector 19A, an additional trailer mounted male coupler plug or connector 60, which is circular in cross section and is slidably received by a storage holder, generally designated 40 (FIG. 2A).

The storage holder 40 includes a base 42 which is mounted on the upper side of the trailer tongue 11 and includes an integral, expansible and contractible sleeve 44 comprising a pair of upstanding, curvilinear legs 46 and 48 which are cantileverly integrally supported on the base 42 and include terminal ends 50 and 52, respectively, which are spaced apart by a gap 54. The device 40 may suitably comprise electrically nonconductive material such as plastic which will yield to axially receive the mating couplers 60 and 19, with each having an outside diameter that is equal to or slightly greater than the inside diameter of the sleeve 44.

Figure 2:
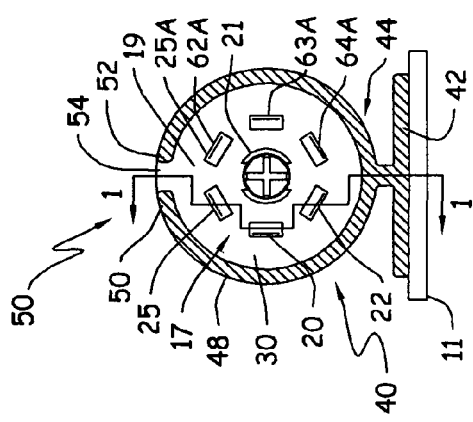
FIG. 2 is a slightly reduced, sectional end view taken along the section line-2-2 of FIG. 1.
Figure 2A:
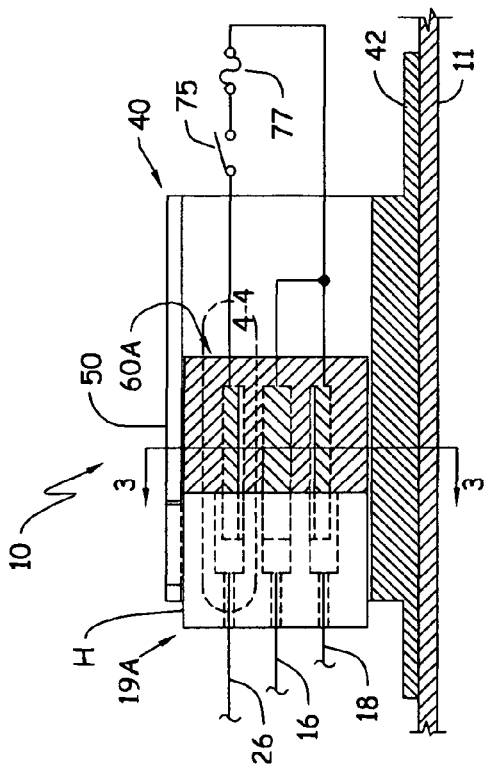
FIG. 2A is a sectional side view, similar to FIG. 1, illustrating an electrical pigtail trailer socket, detachably received by and electrically connected to apparatus constructed according to the present invention stowed on the trailer.
Figure 4:
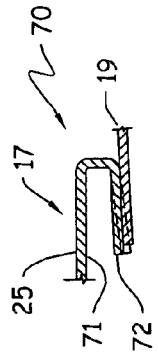
FIG. 4 is a greatly enlarged side elevational view of the portion illustrated in the chain line circle 44 of FIG. 1 to more particularly illustrate the mating electrical terminals of the trailer pigtail connector and the apparatus constructed according to the present invention.

The male connector 60 includes a plurality of electrical blades or prongs, generally designated 61, which are generally complementally formed to the female receptacles 17 for slidably receiving therein (FIGS. 2A and 4). The receptacles 17 are schematically illustrated in FIG. 3 as being generally rectangular and in FIG. 4 as including U-shaped spring metal blades 70 each having a base leg 71 and a folded over terminal leg 72 which is yieldably urged from the inoperative position, illustrated in chain lines in FIG. 4, to the operative electrical energizing position, illustrated in solid lines in FIG. 4, when the socket connector 19 is axially moved into the storage holder 40 and is electrically connected to the mating male connector 60 disposed in the storage device 40.

The male connector 60 may be referred to as a "dummy plug" for stowing the pigtail connector A as the blades 61 are not normally electrically connected to the trailer circuitry 13 unless a short circuiting switch 75 is intentionally closed. The male coupling or connector 60 for energizing the lights 12 and 14 of the abandoned vehicle, includes blades, generally designated 61 and more particularly individually designated 62, 63, 64, 62A, 63A and 64A which are slidably received in female receptacles 25, 20, 22, 25A, 20A and 22A, respectively, as schematically illustrated in FIGS. 3 and 4.

The apparatus 10 also includes a circuit completion system, generally designated 80 (FIGS. 1 and 3), which includes a line 82 electrically coupled to the blades 62 and 64. The line 82 includes the normally opened switch 75 and a fuse 77. The circuit line 82, via the plug blades 62, 63, and 64 and the mating female socket terminals 25, 20 and 22, thus electrically connects the trailer battery 28 to the lights 12 and 14. The normally open short circuit switch 75 can be manually operated to complete an electrical circuit from the battery 28 and independent circuit line 26 to the trailer lights 12 and 14 via independent circuit lines 16 and 18 so that the lights 12 and 14 can be selectively energized or de-energized as necessary and desirable.

Figure 3:
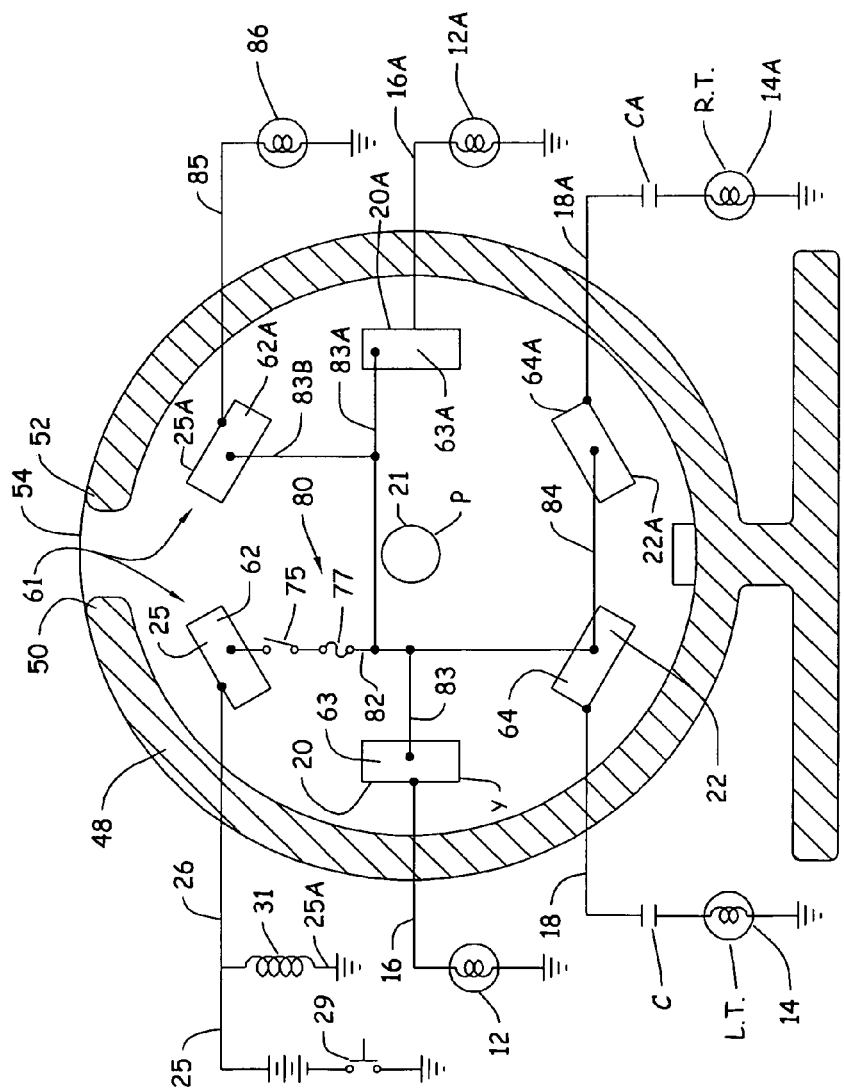
FIG. 3 is a greatly enlarged sectional end, similar to FIG. 2 but taken along the section line 3-3 of FIG. 2A, illustrating an electrical operating circuit superimposed thereon.

As illustrated in FIG. 3, the female sockets 25A, 20A and 22A are illustrated as being electrically connected to clearance lamp 86, head or tail lamps 12A and right turn signal lamp 14A via circuit lines 85, 16A and 18A, respectively, and to female sockets 25, 20 and 22 via circuit lines 83A and 83B, 83A, and 84, respectively.

THE OPERATION AND METHOD

When the trailer T is coupled to the draft vehicle V, the trailer pigtail or female socket coupler or connector 19 is coupled to the tow vehicle male coupler or pigtail 19A, as illustrated in chain lines in FIG. 1. When the tow vehicle V is disconnected from the trailer T, the trailer pigtail connector or female socket 19 is decoupled the tow vehicle V and moved from the vehicle coupling position, illustrated in chain lines in FIG. 1, to the inoperative position illustrated in solid lines in FIG. 1 axially aligned with the opening O in the storage unit 40.

The trailer connector 19 is then moved axially inwardly into the opening or the storage unit 40 until it is received by the male connector 60 with male blades 61 radially outwardly urging the female socket terminal legs 72 to the position illustrated in FIG. 4.

When it is desired to electrically operate the lamps 12 and 14 of the abandoned trailer T, the normally open hand operated switch 75 is closed to short circuit male terminal blades 62, 63 and 64 so that electrical power will flow from the trailer battery 28 via circuit line 26 to the female socket 25, thence to the male blade 62, circuit lines 82 and 83 to sockets 20, 22, 25A, 20A and 22A, so that all of the lamps 12, 12A, 14, 14A and 86 are lighted.

It should be further understood that although the trailer pigtail 19 is illustrated as being a female socket and the vehicle connector 19A and the stowing plug 60 are illustrated as being male, it should be understood they could be reversed such that the trailer mounted pigtail connector 19 was a male connector and the vehicle connector 19A and the stowing plug 19 are female sockets.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. An emergency electrical coupling and stowing system for a trailer, said system comprising:
    a battery (28);
    a light (12);
    a female connector (19) having a first female socket terminal (25) electrically coupled in a first circuit to said battery and a second, independent, female socket terminal (17) independently electrically coupled in a second independent circuit to said light;
    a male connector (60), complementally formed to said female connector for detachably receiving by said female connector wherein said male connector includes first and second male terminals (61) detachably receivable, in mating electrical contact, by said first and second female socket terminals, respectively;
    a switch (75) for selectively completing and interrupting the electrical circuit between said first and second male terminals to thereby selectively complete an electrical circuit between said battery and said light when said female connector receives said male connector; and
    a means for stowing (40) said male connector on a trailer including an open-ended, expansible and contractible cylinder of electrically non-conductive material wherein said means for stowing is further adapted for stowing both said male connector and said female connector when said male terminals and said female socket terminals are engaged.

2. The system set forth in claim 1 wherein said means of stowing further includes a base for mounting to said trailer.

3. The system set forth in claim 1 wherein said first female socket terminal is further electrically coupled in said first circuit to an electrically energized, trailer brake.

4. The system set forth in claim 1 wherein said light is a front light, a rear light, a flashing light, or a combination of any of these lights.

* * * * *